United States Patent [19]
Angle

[11] Patent Number: 5,142,870
[45] Date of Patent: Sep. 1, 1992

[54] HYDRAULIC COMPRESSOR AND FUEL FIRED TURBINE APPARATUS

[76] Inventor: Lonnie L. Angle, 1951 E. Fairfield, Mesa, Ariz. 85203

[21] Appl. No.: 490,084

[22] Filed: Mar. 7, 1990

Related U.S. Application Data

[62] Division of Ser. No. 268,950, Nov. 8, 1988.

[51] Int. Cl.⁵ .............................................. F02C 1/04
[52] U.S. Cl. ...................................... 60/668; 60/398; 60/412; 60/682; 440/49
[58] Field of Search ................. 60/398, 412, 650, 682, 60/668; 440/49

[56] References Cited
U.S. PATENT DOCUMENTS 4,698,974  10/1987  Wood .............................. 60/668 X

*Primary Examiner*—Allen M. Ostrager
*Attorney, Agent, or Firm*—H. Gordon Shields

[57] ABSTRACT

Hydraulic air compressor and fuel fired turbine apparatus disposed in a vessel or ship includes a hydraulic compressor having an air intake disposed above the water intake for entraining air in falling water, and the output of the hydraulic compressor is used as a compressed air source for turbine apparatus. The turbine apparatus includes a regenerator for heating the incoming compressed air output from the hydraulic air compressor. The hydraulic air compressor includes, in one embodiment, pump elements for providing a flow of water for when the ship or vessel is not moving and a flow of air to be entrained and compressed.

5 Claims, 3 Drawing Sheets

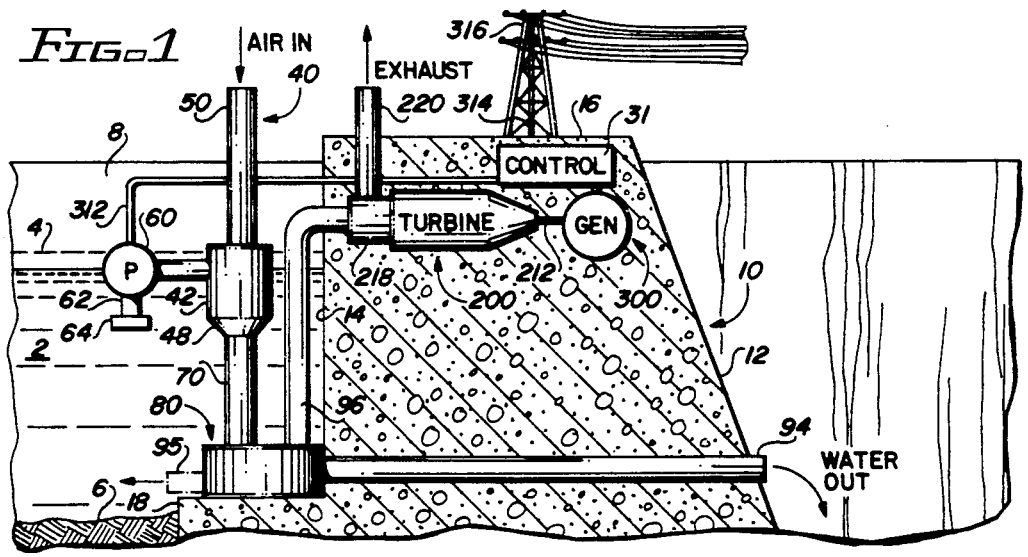
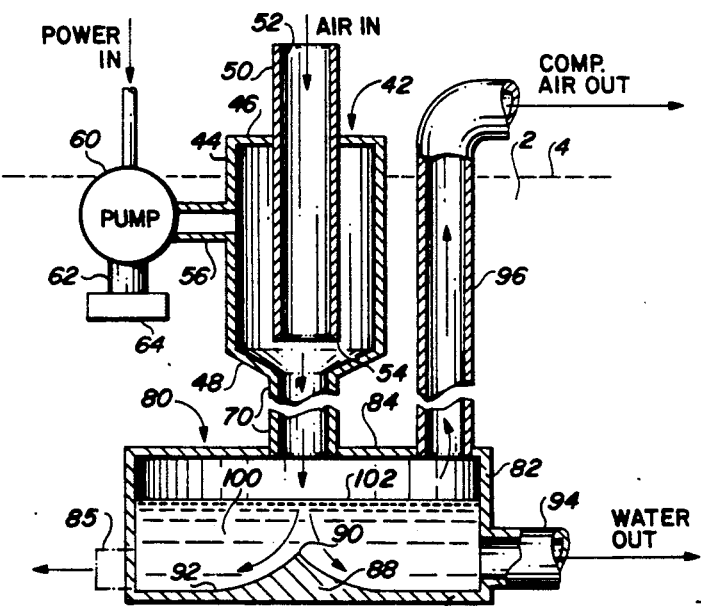
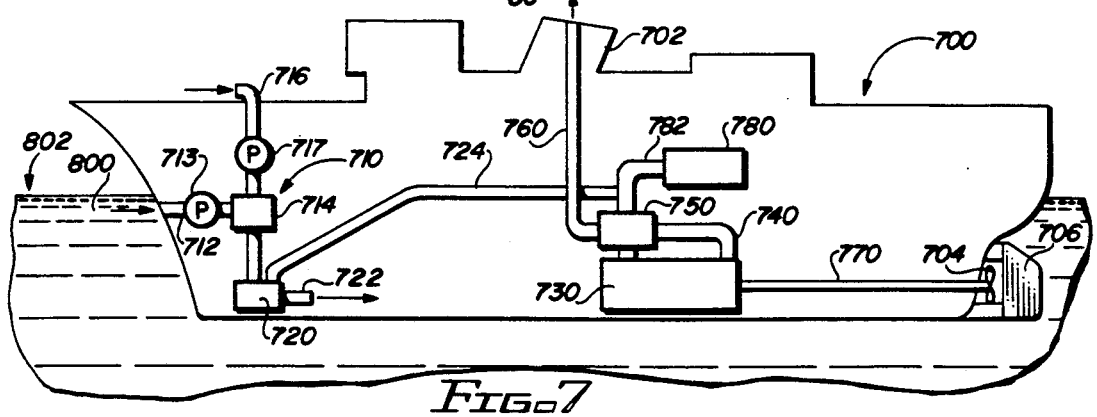

HYDRAULIC COMPRESSOR AND FUEL FIRED TURBINE APPARATUS

CROSS REFERENCE TO RELATED APPLICATION

This application is a divisional application of Ser. No. 07/268,950, filed Nov. 8, 1988.

BACKGROUND OF THE INVENTION

1. Field of the Invention

This invention relates to hydraulic air compressors or compressed air storage systems and fuel fired turbines, and, more particularly, to hydraulic air compressors and/or compressed air storage systems for providing compressed air for fuel fired turbines.

2. Description of the Prior Art

U.S. Pat. No. 4,307,299 (Norton) discloses a hydraulic air compressor system providing compressed air to a fuel fired turbine. The apparatus disclosed is drawn to a hydraulic air compressor in combination with both a fuel fired turbine and a hydraulic generating system. The fuel fired turbine generator is discussed only in broad terms and is shown only schematically. The hydraulic air compressor is shown in more detail, and two different embodiments of the hydraulic air compressor are illustrated.

U.S. Pat. No. 4,462,205 (Giles et al) discloses a hydraulic air compressor utilized in a gas turbine system utilizing coal as the raw material. The coal is gasified, and the gas is used as the fuel for the turbine.

Hydraulic air compressors, by themselves, have been known for many years. Various embodiments of hydraulic air compressors are disclosed in the following U.S. patents: U.S. Pat. Nos. 199,819 (Frizell), 317,074 (Baloche et al), 383,429 (Arthur), 643,411 (Taylor), 682,811 (Paterson), 880,187 (Blakney), 885,301 (Siepermann et al), 1,057,961 (Heirich), 1,628,025 (Boving), and 4,278,405 (Angle).

It will be noted that all previous hydraulic air compressor patents have an entrainment head above the compressor head of the hydraulic air compressor, and which is used to flow air and water down to a separating chamber. No elevated entrainment head is required in this application. Water is drawn through or pumped to the eductor. This allows for the hydraulic air compressor to be placed before and above a dam, and not below the dam. More importantly, it allows a hydraulic air compressor to be placed in a hole, as in a lake or ocean, and it allows it to be powered totally by a pump for a closed cycle. It also allows the hydraulic air compressor to be used in conjunction with all previous art if additional air is required at the fuel-fired turbine, as shown schematically in U.S. Pat. No. 4,307,299 (Norton).

U.S. Pat. No. 2,010,823 (Noack) discloses a turbine engine in which an air fuel mix is exploded in a combustion chamber. Under low power conditions, additional compressed air is supplied from a central tank to provide minimum pressure and gas flow for combustion and for exhaust scavaging.

U.S. Pat. No. 2,115,644 (Modesse) discloses a compressed air supply for a turbine engine. A piston type compressor is utilized to provide compressed air.

U.S. Pat. No. 2,390,959 (Pfenninger) discloses a gas turbine system for utilizing a blower or compressor backed by an electric motor. When the turbine is operating under no load or light load conditions, the motor drives the compressor to provide air flow to the combustion chamber.

U.S. Pat. No. 2,650,060 (Stalker) discloses a gas turbine system in which a small gas turbine is used as a starter for a larger turbine. The small turbine is in turn started by an electric motor which drives a compressor. A compressor in turn provides compressed air for the small turbine.

U.S. Pat. No. 2,941,790 (Compton et al) discloses a gas turbine system which utilizes a compressed air tank. The compressed air tank is used to provide compressed air for starting the turbine. The compressed air is also used for combustion purposes. The compressed air, exhausted from the compressor portion of the system, is also directed to the combustion chambers. After the turbine is started, the compressed air tank is recharged from the turbine compressor. The compressed air charged is then maintained for the next engine start.

U.S. Pat. No. 4,312,179 (Zaugg) discloses a gas turbine power plant which utilizes a compressed air storage tank. The compressed air storage tank provides additional compressed air for operating the turbine during periods of high load and is replenished by the turbine compressor as loads allow. The compressed air storage tank is apparently relatively large, and is referred to in the patent as an air reserve cell. This would appear to imply that the compressed air storage is relatively large, and not merely a conventional "tank" such as discussed in the above-cited patents.

SUMMARY OF THE INVENTION

The invention described and claimed herein includes a hydraulic air compressor having an air source disposed above a water source, and the compressed air output of the hydraulic air compressor is utilized as the compressed air in a fuel fired turbine.

Among the objects of the present invention are the following:

To provide new and useful hydraulic air compressor and fuel fired turbine apparatus;

To provide new and useful hydraulic air compressor apparatus for providing compressed air for a fuel fired turbine;

To provide new and useful fuel fired turbine apparatus utilizing compressed air from a hydraulic air compressor;

To provide new and useful fuel fired turbine apparatus utilizing compressed air from compressed air storage chambers;

To provide new and useful hydraulic air compressor apparatus in which an air inlet is disposed above a water inlet;

To provide new and useful hydraulic air compressor apparatus and fuel fired turbine apparatus are disposed in a boat;

To provide new and useful fuel fired turbine apparatus utilizing compressed air from a hydraulic air compressor in place of a compressor stage; and To provide new and useful hydraulic air compressor and fuel fired turbine apparatus utilizing a regenerator for increasing the temperature of the compressed air to the turbine and for reducing the exhaust temperature of the turbine.

BRIEF DESCRIPTION OF THE DRAWING

FIG. 1 is a schematic representation of the apparatus of the present invention in one use environment.

FIG. 2 is a side view in partial section of a portion of the apparatus of FIG. 1.

FIG. 7 is a schematic representation of an alternate use embodiment of the apparatus of the present invention.

DESCRIPTION OF THE PREFERRED EMBODIMENT

Figure 3:
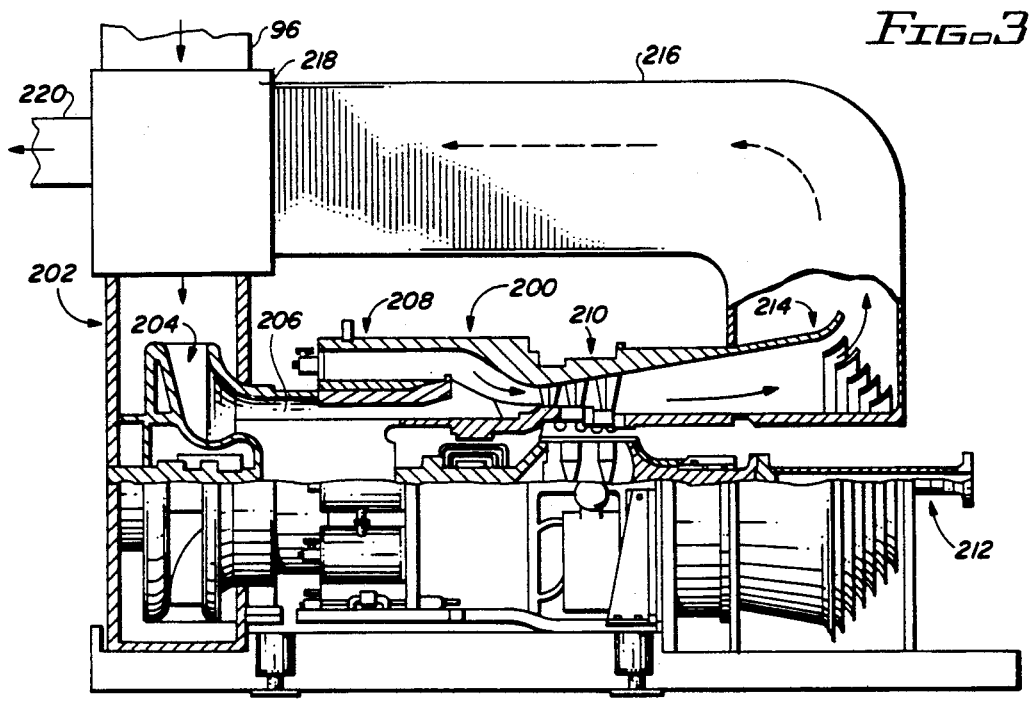
FIG. 3 is a side view schematically representing a portion of the apparatus of the present invention.

FIG. 1 is a schematic representation of the apparatus of the present invention in a use environment. The use environment includes a lake 2 which has a top surface 4 and a bottom 6. The lake is bounded by a lake shore 8 and a dam 10.

The dam 10 includes a front face 12, a rear face 14, and a top 16. At the bottom rear of the dam 10 is a rear bottom shelf 18. A portion of the apparatus of the present invention is disposed on the rear bottom shelf 18.

The apparatus of the present invention, in the environment of the lake 2, includes hydraulic compressor apparatus 40 and a turbine 200. The hydraulic compressor apparatus 40 of FIG. 1 is shown in detail in FIG. 2. FIG. 2 is a side view in partial section of the hydraulic compressor 40 of FIG. 1. For the following discussion, reference will primarily be made to FIGS. 1 and 2.

The hydraulic compressor apparatus 40 includes an eductor housing 42 which includes a cylinder 44 closed by a top plate 46, and a tapered bottom 48.

Extending downwardly through the top plate 46 is an air intake pipe 50. The air intake pipe 50 includes a top 52 which is above the top surface 4 of the lake 2. The air intake pipe 50 also includes a bottom 54 within the cylinder 44, and adjacent to the downwardly and inwardly tapering bottom portion 48.

Adjacent to the cylinder 44 is a pump 60. It will be noted that the pump 60 is disposed within the lake 2. The pump 60 is connected to the cylinder 44 by a water intake pipe 56. The water intake pipe 56 extends through the cylinder 44 downwardly from the top plate 46, and above the tapered portion 48, and accordingly also above the bottom 54 of the air intake pipe 50.

Water flows to the pump 60 through a water intake pipe 62, which extends downwardly from the pump 60. The water intake pipe 60 is closed by a filter 64 on its lower end. Water is pumped through the filter 64 and through the water intake pipe 62. The pumped water then flows through the water intake pipe 56 into the cylinder 44 of the eductor housing 42. The water flowing through the pipe 46 and into the cylinder 44 flows downwardly within the cylinder 44 and out of the housing 42, through the inwardly tapering bottom portion 48, and into a down pipe 70.

The water flowing by the bottom 54 of the air intake pipe 50 within the cylinder 44 causes air to flow downwardly into the pipe 50. The water flowing downwardly mixes with the air from the pipe 50 in the tapered portion 48. The tapered portion 48 essentially acts as a venturi to help pull the air into the stream of water, thus entraining the air into the falling water. The falling water and air mixture causes the air entrained in the water to be compressed as the air and water flow downwardly in the down pipe 70.

Disposed on the bottom shelf 18 is a separator 80. The separator 80 includes a generally cylindrical housing 82 closed by a top plate 82 and a bottom plate 86. The down pipe 70 extends through the top plate 84.

Within the housing 82, and adjacent to the bottom 86, is a separator cone 88. The separator cone 88 is disposed generally axially aligned with the down pipe 70. The water and air falling or flowing in the down pipe 70 flows into the cylinder 82 and onto the cone 88. The cone 88 tapers outwardly from a central point 90. Away from the point 90 of the cone 88 is an outwardly tapering portion 92 which gradually becomes flat and joins the bottom 86 of the cylinder 82. As the water and air flows onto the cone 88, and outwardly from the point 90, the entrained air separates from the water and rises to the top of the cylinder 82. In FIG. 2, water flowing downwardly into the cylinder 82 is indicated by reference number 100, and the top of the water 100 is indicated by reference numeral 102.

The water 100 flows out of the cylinder 82 through a water out pipe 94. As indicated in FIG. 1, the water 100 flows out of the pipe 94 outwardly from the front face 12 of the dam 10.

It will be noted that the water 100 need not be discharged outwardly through the dam 10. Rather, the water 100 may be returned to the lake 2 by a pipe 95, shown in phantom. When the water 100 is returned to the lake 2 through pipe 95, the pump 60 is required. When the water 100 is discharged through the dam 10 by the pipe 94, the pump 60 is not required. In the latter case, the lake water will flow naturally into the eductor 42.

The compressed air, separated from the water 100, flows upwardly through a compressed air pipe 96 from the separator 80. The compressed air pipe 96 extends to the turbine 100.

FIG. 3 is a side view schematically representing the turbine 200 and elements associated therewith. For the following discussion, reference will primarily be made to FIGS. 1 and 3.

The cold compressed air, flowing through the pipe 96, flows to a heat exchanger 218, where it receives heat from exhaust gases from the turbine 200. The compressed air, heated in the heat exchanger 218, flows into an air intake housing 202 of the turbine 200. The air intake housing 202 is appropriately connected to the heat exchanger 218. Within the air intake housing 202 is a plurality of air inlet guides 204 of the turbine 200. The air inlet guides 204 cause the hot compressed air flowing downwardly through the pipe 96 and the heat exchanger 218 to change direction and to flow generally horizontally within an air inlet chamber 206 of the turbine 200. From the air inlet chamber 206, the air again changes direction, and flows through a combustion section 208 of the turbine 200. It will be noted that the turbine 200 does not include a compressor section. Rather, the compressed air from the hydraulic air compressor apparatus 40 is used in the turbine 200 in place of a compressor section.

In the combustion section 208, the hot, compressed air is appropriately combined with fuel, and combustion takes place. From the combustion section 208, the hot gases from the combustion section flow to a turbine section 210. The turbine section 210 is appropriately connected to an output shaft 212. Rotation of the turbine section 210, from the hot gases flowing from the combustion section 208, cause rotation of the turbine section 210 and accordingly of the output shaft 212.

The gases flowing from the turbine section 210 flow to an exhaust section 214. The exhaust section 214 is in turn connected to an exhaust duct 216. The exhaust duct 216 extends from the exhaust section 214 to the heat exchanger 218. From the heat exchanger 218, the exhaust gases, cooled by the exchange of heat with the cold air flowing through the pipe 96, flows outwardly through an exhaust pipe or conduit 220, and the gases are appropriately vented to the atmosphere, etc., from the exhaust pipe 220.

The output shaft 212 is appropriately connected to a generator 300. Electricity from the generator 300 is controlled by a control section 310. The control section 310, for purposes of the present invention, divides the electricity into two portions, a portion of which flows through electrical conduits 312 to power the pump 60, and other equipment necessary to support the system or cycle. The remaining electrical energy flows through an electrical conduit 314 to distribution lines 316, for appropriate distribution in an electrical grid, or the like.

From the above discussion, it will be understood that hydraulic air compressor apparatus 40 produces compressed air for the turbine 200. The turbine 200 in turn provides energy from combustion, utilizing the compressed air, to power a generator 300. A portion of the electrical energy generated is utilized by the pump 60 to provide water for the hydraulic compressor 40. The remaining electrical energy is appropriately distributed, as desired.

Figure 5:
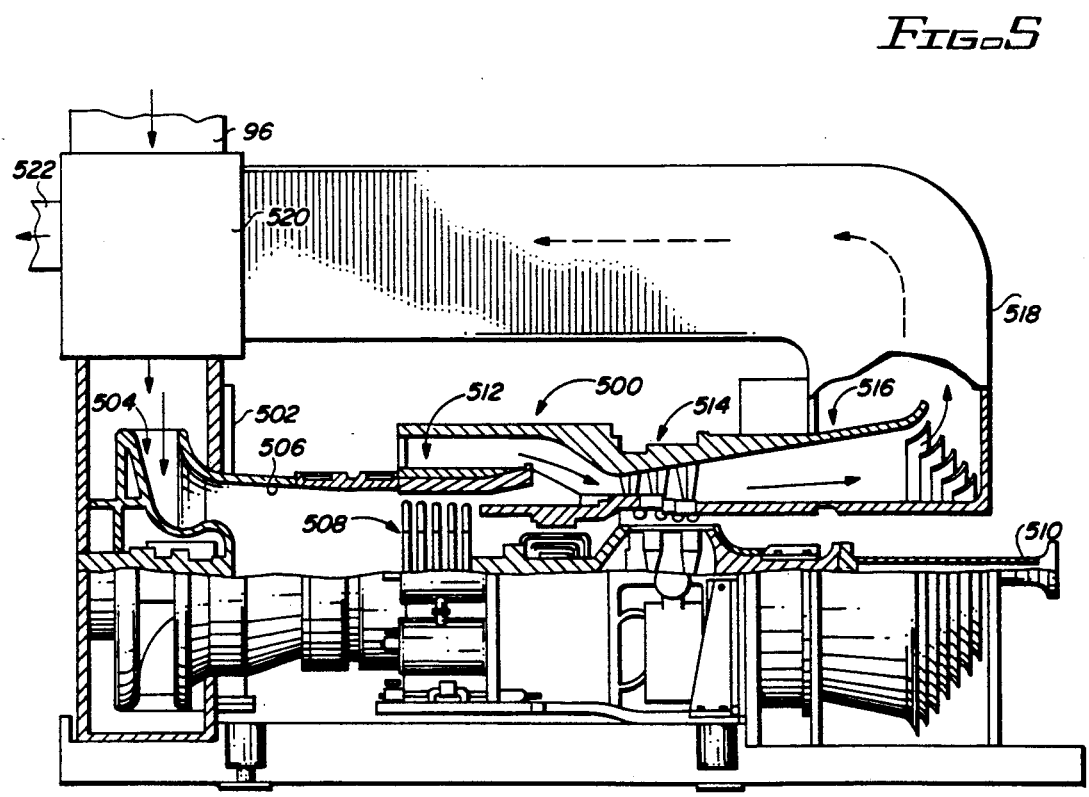
FIG. 5 is a side view of an alternate embodiment of the apparatus of FIG. 3.
Figure 4:
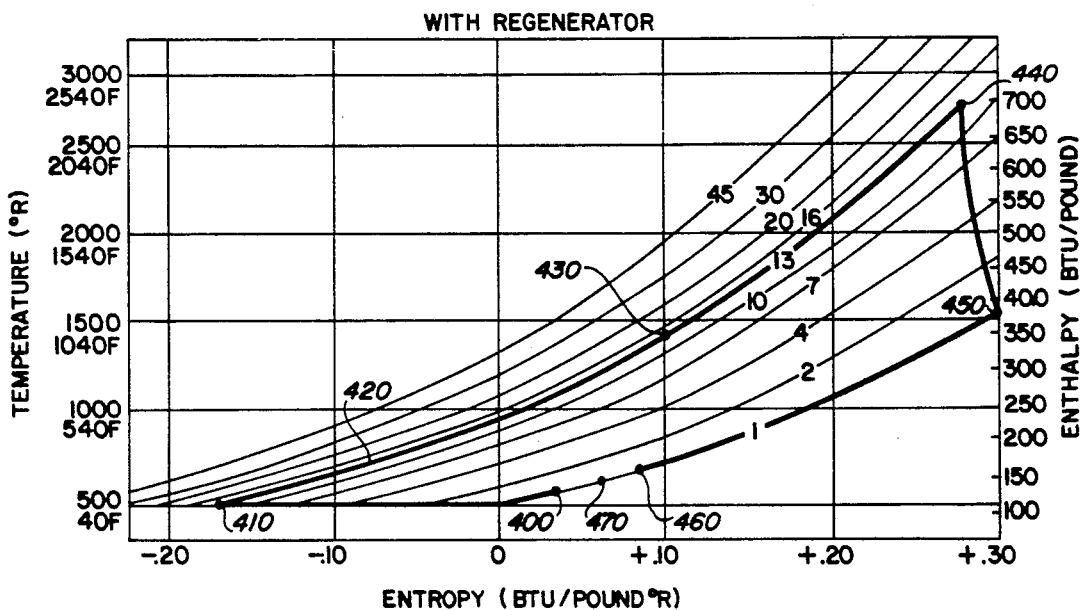
FIG. 4 is a chart illustrating the thermodynamic cycle in terms of entropy and enthalpy of the apparatus of FIG. 3.

FIG. 5 is a T-S or entropy-enthalpy diagram illustrating the thermodynamic characteristics or cycle of the apparatus of FIG. 4. The horizontal scale in FIG. 5 is entropy in BTUs per pound per degree rankine. The left vertical scale is in degrees rankine, with degrees Fahrenheit indicated beneath the rankine temperature. The right vertical scale is enthalpy BTUs per pound. The curves indicate the compression of the gas and the fuel, during the operation of the apparatus of the present invention. For the following discussion, reference will be made primarily to FIG. 4, but reference may also be helpful to FIGS. 1 and perhaps 2 and 3.

A point 400 on the chart refers to atmospheric conditions, or to the input conditions of the air at the intake of the hydraulic air compressor apparatus 42. The air is compressed essentially isothermally between point 400 and a point 410. Point 410 represents the outlet of the hydraulic air compressor apparatus 40, or essentially the air flowing in the air output pipe or conduit 96. Point 410 represents the air flowing into the heat exchanger 218 of the turbine apparatus 200.

The compressed air flowing through the heat exchanger 218, which is essentially a regenerator, follows a curve 420 from point 410 to a point 430. Point 430 represents input of the compressed and heated air flowing into the combustion stage 208 of the compressor 200. With the combustion processes taking place, the graph or curve 420 continues upwardly to a point 440. The point 440 indicates the condition of the heated air at the inlet of the turbine 210.

It will be noted that the air at atmospheric pressure, or at point 400, is essentially isothermally compressed between point 400 and point 410. The compressed air is then heated between point 410 and point 440. Between point 410 and point 430, the heating of the compressed air is through regeneration by the heat exchanger 218.

From point 430 to point 440 the increased heat is the result of combustion in the combustion stage 208 by the adding of fuel to the compressed air and by the combustion of the fuel with the air.

It will be noted that any type of fuel may be used by the turbine apparatus 200. If natural gas or any other essentially sulfur-free fuel is used, problems associated with sulfur dioxide are generally eliminated.

From point 440, which is the point of maximum enthalpy, the enthalpy decreases to a point 450 in the turbine stage 210. Between point 450 and point 460 represents the exhaust stage of the turbine apparatus, with the accompanying release of heat, and with a substantial amount of the heat being utilized in the regeneration process. The balance of the heat loss, or the decrease in enthalpy being due to the exhausting of the gases to the atmosphere.

It will be noted that if natural gas or any other essentially sulfur-free fuel is utilized, the release point to the atmosphere will be at a point 470 rather than a point 460. The point 460 is the release point when sulfur laden fuel is used for combustion.

FIG. 5 is a side schematic representation of turbine apparatus 500, usable with the hydraulic compressor apparatus of the present invention.

The turbine apparatus 500 includes an air inlet housing 502 and air inlet guides 504 which receive compressed air from a heat exchanger 520 and air intake housing 502, illustrated in FIG. 3. From the air inlet guides 504, the heated, compressed air flows through an air inlet chamber 506 through a compressor stage 508. The compressor stage 508 is connected to a shaft 510, which is common with a turbine section 244.

From the compressor stage 508, where the heated and compressed air from the heat exchanger 520 is further compressed to increase the pressure above that which is introduced into the air inlet chamber 506. From the compressor stage 508, the heated and further compressed air then flows to a combustion section 512. From the combustion section 512, hot gases flow to a turbine section 514. As indicated above, both the compressor stage 508 and the turbine section 514 are connected to the shaft 510. The shaft 510 accordingly comprises an output shaft which is in turn connected to the generator 300.

From the turbine section 514, the hot gases flow through an exhaust section 516, and thence to the exhaust duct 518.

If the extent of pressure available from the hydraulic air compressor apparatus 40, or any variation thereof is not sufficient, of course, then a compressor stage or stages of some type may be necessary to provide air of sufficient pressure for efficient power production. In turbine apparatus 500, a single or multiple compression stage, or further compression, of the incoming air is accomplished by the compressor section 508. The compressor section, or compressor stage 508, obviously utilizes a portion of the output from the turbine section 514, for the compression, as is well known and understood in the art. Nevertheless, the net power output from the turbine apparatus 500 is greater than, or is sufficient to provide a net gain over, the prior art, even when a portion of the electrical energy is fed back to a pump, and auxiliary equipment, if such is necessary, as discussed above.

Figure 6:
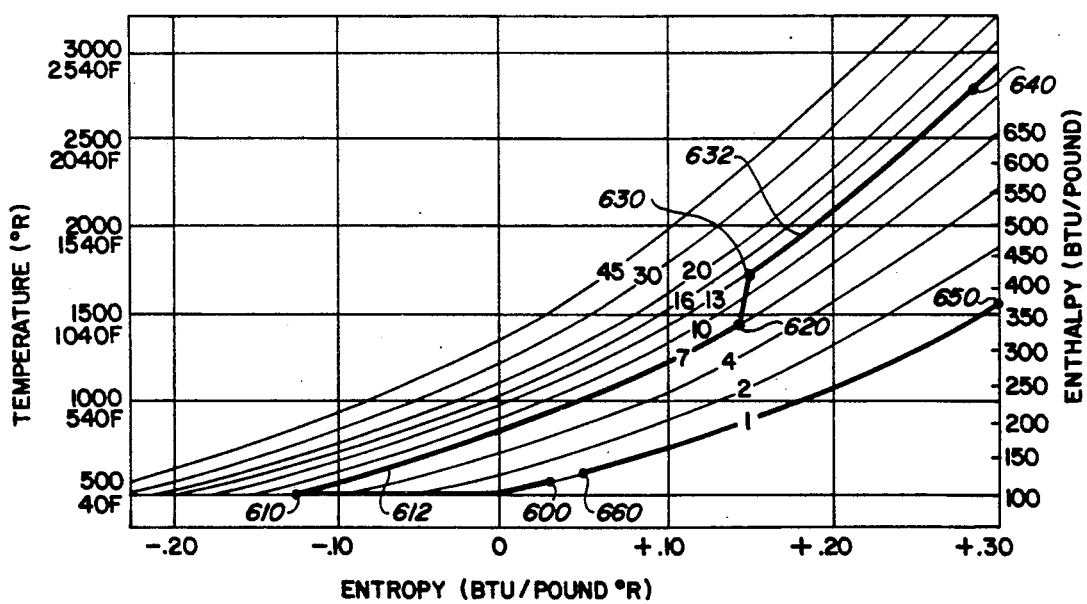
FIG. 6 is a chart illustrating the thermodynamic cycle in terms of entropy and enthalpy of the apparatus of FIG. 5.

FIG. 6 is a T-S or entropy-enthalphy diagram illustrating the thermodynamic characteristics or cycle of the apparatus of FIG. 5. The horizontal scale in FIG. 6 is entropy in BTUs per pound per degree Rankine. The left vertical scale is in degrees Rankine, with degrees Fahrenheit indicated beneath the Rankine temperature. The right vertical scale is enthalpy in BTUs per pound. The curves indicate the compression of the gas and the fuel during the operation of the apparatus of FIG. 5. For the following discussion, reference will be made primarily to FIG. 6, but reference to FIG. 5 may also be helpful.

A point 600 on the chart refers to atmospheric conditions, or to the input conditions of the air at the intake of the hydraulic air compressor apparatus 42. the air is compressed essentially isothermally between point 600 and a point 610. Point 610 represents the outlet of the hydraulic air compressor apparatus 40, or essentially the air flowing in the air output pipe or conduit 96.

In the compressor stage 508 the air is compressed from the initial seven atmospheres of pressure indicated by a curve 612. Point 610 is on the curve 612. The compressor 508 further compresses the air to about thirteen atmospheres of pressure, indicated by point 620 on a curve 622.

The compressed air flowing through the heat exchanger 520, which is essentially a regenerator, follows the curve 622 from the point 620 to a point 630. Point 630 represents input of the compressed and heated air flowing into the combustion stage 512 of the turbine 500. With the combustion processes taking place, the graph or curve 622 continues upwardly to a point 640. The point 640 indicates the condition of the heated air at the inlet of the turbine section 514.

It will be noted that the air at atmospheric pressure, or at point 600, is essentially isothermally compressed between point 600 and point 610. The compressed air is then further compressed from seven atmospheres to thirteen atmospheres by the compressor 508. The curve 622 comprises the thirteen atmospheres of pressure curve. Between point 620 and point 630, the heating of the compressed air is through regeneration by the heat exchanger 520. From point 630 to point 640 the increased heat is the result of the combustion in the combustion stage 512 by the adding of fuel to the compressed air and by the combustion of the fuel with the air.

It will also be noted that the thermodynamic cycle illustrated in FIG. 4 and as discussed above, differs from the actual sequence of events taking place in the turbine apparatus 500. The thermodynamic sequence considers the temperatures and pressures, not the actual timing sequences, involved.

FIG. 7 is a schematic representation of a vessel or ship 700 on a body of water 800, with a water line 802 illustrating the surface of the body of water 800 on or in which the ship 700 is located. The ship 700 includes hydraulic air compressor apparatus 710 of the present invention configured for a vessel. The ship 700 also includes an exhaust stack 702, a propeller 704, and a rudder 706.

The hydraulic air compressor apparatus 710 for the vessel 700 includes a water intake 712, located just below the water line 800 of the vessel. The water intake 710 is connected to an eductor 716. Air for the eductor 714 flows in an air intake pipe 712. From the eductor 714, the water with its entrained air flows downwardly through a pipe or conduit 718 to a separator 720. From the water separator 720, the water, with air separated therefrom, flows outwardly through a discharge pipe 722. The water discharged through the pipe 722 may be returned to the sea, or may be used in the vessel, as desired.

If desired, such as when the vessel 700 is not moving in the water 800, a pump 713 in the water intake conduit 712 may be used to pump water into the eductor 714. Moreover, an air pump or fan 717 in the air intake line 716 may be employed to increase the flow of air to the eductor 714 to increase the air entrained in the flow of water, thus substantially increasing the efficiency of the hydraulic air compressor apparatus 700.

Compressed air from the separator 720 flows through a pipe or conduit 724 to a regenerator or heat exchange unit 750. From the regenerator or heat exchanger 750, the compressed and now heated air flows into the turbine 730. The turbine 730 may be substantially the same as schematically illustrated in FIGS. 3 or 5. That is, the turbine apparatus 730 may include compressor capabilities required to increase the compressed air from the hydraulic air compressor to the desired pressure, in terms of atmospheres of pressure, for the desired operation of the turbine 730.

An exhaust pipe or conduit 740 extends from the turbine 730 to the heat exchanger or regenerator 750. From the heat exchanger 750, the now cooled exhaust gases flow upwardly in a pipe or conduit 760 to be discharged from a stack or funnel 702 of the vessel 700.

The turbine 730 is connected to an output shaft 770 which extends to the propeller 704. The propeller 704 is, of course, disposed at the stern of the vessel 700, and adjacent to the rudder 706.

It will be understood that a vessel typically includes several turbines, and each turbine may have an output shaft connected to one or more output shafts driving one or more propellers. It will also be obvious that a vessel may include several hydraulic air compressors, with at least one air compressor typically connected to a turbine. If desired, more than one hydraulic air compressor may be connected to a single turbine.

The extent of compression by a hydraulic air compressor in a vessel is limited, of course, by the overall vertical height available between the water intake and the separator chamber. In some vessels, the relative length may be somewhat limited and in other vessels, particularly deep draft vessels, the length may be sufficient for use by turbine with minimal compression required in the turbine. Obviously, the particular requirements of a vessel may vary, depending on the particular circumstances, or size, of a vessel.

Moreover, the ram or kinetic energy in the air and the water as the ship or vessel moves also contributes to the efficiency of the hydraulic air and the greater the velocity of the air taken into the intake 716, the greater the efficiency of the apparatus 710.

Note that the velocity or speed of the vessel 700 relative to the air and the velocity of the air taken in are independent. That is, if the vessel 700 is moving in the water, the energy of the water taken in at the intake 712 is primarily a function of the speed of the vessel. However, the wind or moving air is independent of the vessel, and the speed of the vessel may be an additive or subtractive factor to the air velocity depending on the direction of the wind or moving air relative to the vessel 700.

For starting the turbine 730, and for desired acceleration, compressed air storage facility 780 may be employed. The compressed air storage facility 780 may be a network of pipes extending substantially the full length of the vessel 700 or any other element(s) appropriate to the vessel.

The compressed air storage facility 780 is appropriately connected to the heat exchanger 750 or to the compressed air conduit 724, as desired. Obviously, valves and other elements will be necessary in the system.

The compressed air in the facility 780 may be from any appropriate source, as desired.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. As an example, and without limitation, it is obvious that various valves will be required, particularly in the air lines or conduits. Various types of electrical controls may be required, none of which have been shown or discussed. The appended claims are intended to cover and embrace any and all such modifications, within the limits only of the true spirit and scope of the invention.

What I claim is:

1. In a vessel movable on a body of water and having a propeller and an output shaft connected to the propeller, a propulsion system, comprising, in combination:

turbine means connected to the output shaft;

an air eductor for entraining air in a flow of water;

water intake means for providing a flow of water from the body of water on which the vessel is moving to the eductor;

air intake means for providing air to be entrained in the flow of water by the eductor;

first conduit means for receiving the flow of water and entrained air from the eductor and for compressing the entrained air;

separator means for separating the water and the compressed air entrained in the water; and second conduit means extending from the separator means to the turbine means through which the compressed air flows from the separator to provide compressed air to the turbine means.

2. The apparatus of claim 1 in which the second conduit means includes storage means for storing the compressed air.

3. The apparatus of claim 1 in which the turbine means includes heat exchanger means, and the second conduit means is connected to the heat exchanger means for heating the compressed air flowing to the turbine means.

4. The apparatus of claim 1 in in which the water intake means includes a pump for providing the flow of water.

5. The apparatus of claim 1 in which the air intake means includes a pump for providing a flow of air to be entrained.

* * * * *